Figure 1:
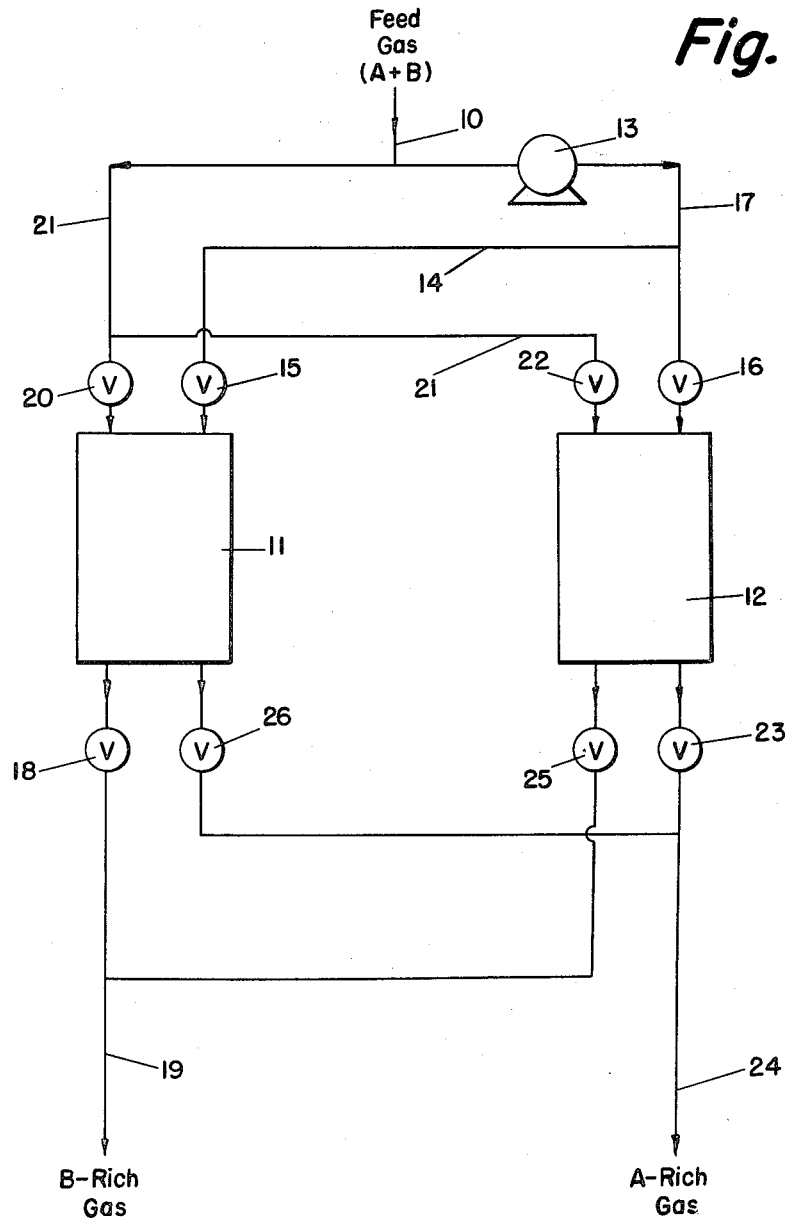

Dec. 22, 1959   C. H. BROOKS   2,918,140
TREATMENT OF GAS MIXTURES
Filed June 20, 1958   2 Sheets-Sheet 1

INVENTOR.
CHARLES H. BROOKS
BY
ATTORNEY

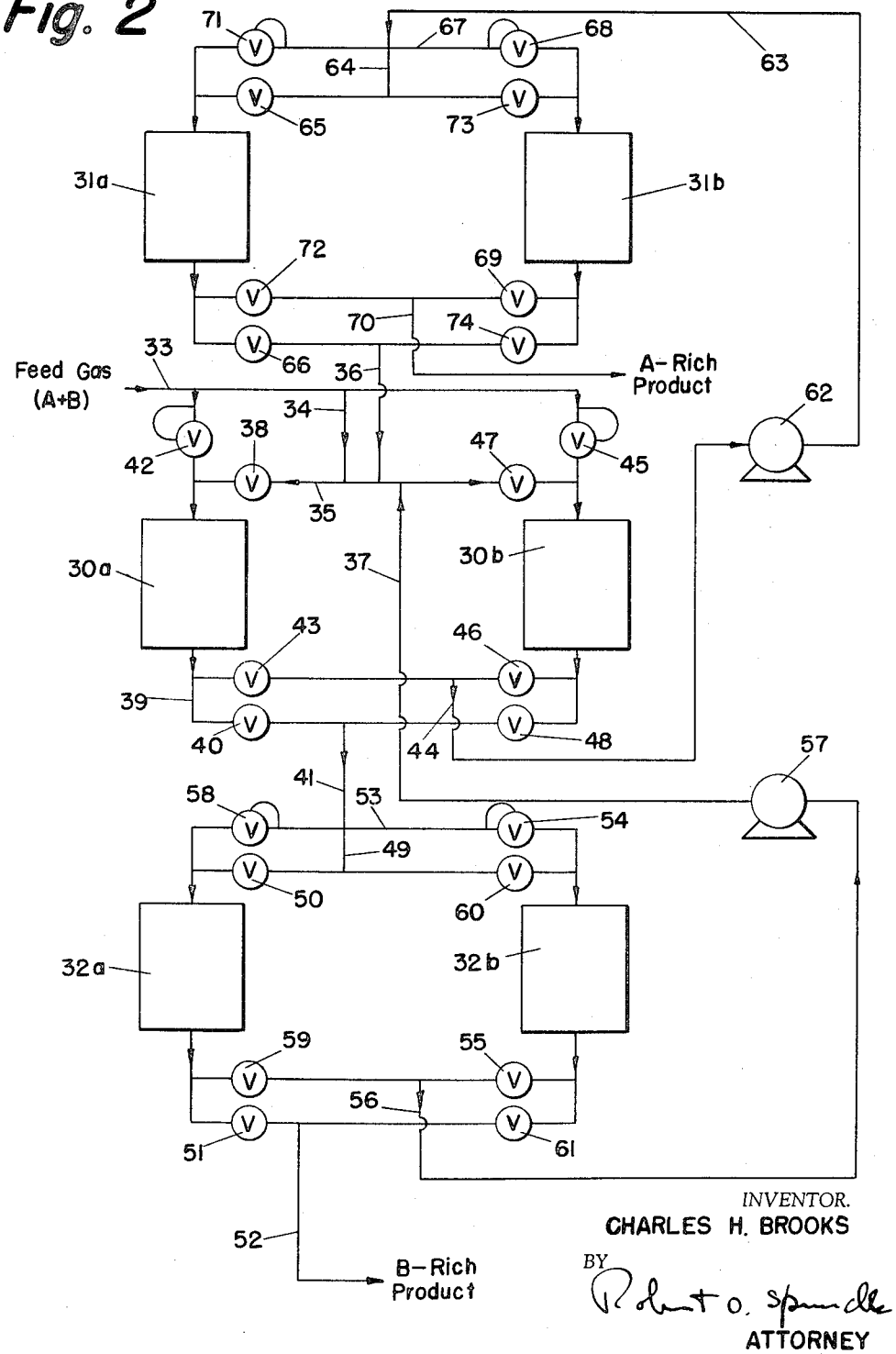

United States Patent Office 2,918,140
Patented Dec. 22, 1959

2,918,140

TREATMENT OF GAS MIXTURES

Charles H. Brooks, Swarthmore, Pa., assignor to Sun Oil Company, Philadelphia, Pa., a corporation of New Jersey Application June 20, 1958, Serial No. 743,299

4 Claims. (Cl. 183—114.2)

This invention relates to a method for separating a mixture of gaseous materials. More particularly the invention is directed to a method for preferentially removing one or more components from a gas mixture by means of an adsorbent wherein no heat is required for regenerating the adsorbent. The invention can be applied to the fractionation of a gas mixture in which each constituent is present in considerable amount, but it has particular utility for separating from a gas mixture a constituent which is present only in small amount.

There are numerous instances in commercial practice where the feed material for a particular operation, such as a petrochemical process, is required to be of unusually high purity. The stock from which the feed material is prepared often may be composed of compounds which have relatively close boiling points and therefore cannot readily be separated from each other by fractional distillation. Under commercially practical distillation conditions an enriched product may be obtained which still does not have the desired purity required for a particular chemical process. For example, in processes for making polyolefins such as polyethylene or polypropylene, it may be important that the olefin feed have a purity of 98% or better. In fractionating a refinery ethylene-ethane or propylene-propane stock, however, employing relatively good fractionating conditions for commercial practice, the olefin product still may have a purity of only 80–90%. In such cases a suitable means for further purifying the concentrate is needed.

Selective adsorption, utilizing an adsorbent which will preferentially remove an impurity, is one means which has been employed for further purifying materials after distillation. For successful operation of an adsorption process it is generally necessary periodically to regenerate the adsorbent for further use. This is customarily done by heating the adsorbent, usually by blowing it with steam or other hot inert gas, to drive off the adsorbed material. The adsorbent then is cooled prior to re-use. In conventional operations of this kind suitable means are required for supplying heat to the system and for cooling the adsorbent after it has been regenerated. The requisite fuel requirements and the equipment that must be provided for heating and cooling add to the costs of the operation.

The present invention provides a method for separating or purifying gaseous materials by means of an adsorbent without any necessity for supplying heat to regenerate the adsorbent. The invention is applicable to the treatment of any gaseous material in which either the desired or the undesired component is capable of being selectively adsorbed by a suitable adsorbent. The selectively adsorbable component may be one present in the feed in any concentration ranging from low to high. The removal of undesired components from low boiling hydrocarbons is a particularly useful application of the invention. For example, the purification of ethylene by selectively adsorbing ethane therefrom by means of activated carbon can be effected by the present process. Likewise, propane can be removed from a propylene concentrate by utilizing activated carbon, or ethylene containing carbon monoxide can be purified by employing commercially available adsorbents known as molecular sieves. Many gaseous mixtures can be separated in accordance with the invention by employing contact masses of the type used in chromatography. These generally comprise a particle-form solid having little or no adsorptive properties, such as crushed fire brick, impregnated with a high boiling liquid which has differential absorbing abilities for the components of a gas mixture. For the purpose of the present invention such contact masses are considered the equivalent of selective adsorbents.

In one aspect the present invention provides a method for removing a constituent from a feed gas, which involves a cyclic operation wherein the feed gas is contacted at relatively high pressure for a short time with an adsorbent which is capable of selectively adsorbing such constituent. The adsorbent is then regenerated without heating by contacting it with a further amount of feed gas but at relatively low pressure. This causes the adsorbed constituent to be desorbed and allows the adsorbent to be directly re-used in another cycle of operation.

In another aspect the invention provides a process for treating a feed gas which process utilizes a series of treating zones containing a selective adsorbent. The feed gas, in admixture with certain recycle streams, is contacted under high presure for a short time with the adsorbent to selectively remove a component. Partially purified product from this zone is sent to a second zone where it is contacted under high pressure with the adsorbent to effect further purification and yield a product which is lean with respect to the selectively adsorbable component. After a short operating time the first zone enters a regeneration stage of its cycle, wherein the adsorbent is contacted with feed gas alone under low pressure to desorb the removed component. The resulting mixture containing this component in higher concentration than it occurs in the feed is compressed and then contacted at high pressure with the adsorbent in a third zone. Effluent from the third zone during this stage of its operation consitutes one of the previously mentioned recycle streams which is sent to the first treating zone. After a short time of operation at high pressure each of the second and third zones enters a regeneration stage of its cycle wherein the pressure of the gas being fed to it is reduced and contact of gas and the adsorbent is then continued at low pressure. Effluent from the second zone during this stage is compressed and constitutes the other recycle stream previously mentioned. Effluent from the third zone during this stage constitutes a product of the process which is enriched with respect to the selectively adsorbable component.

The invention is described more specifically with reference to Figs. 1 and 2 which are diagrammatic flowsheets illustrating embodiments of the invention.

Referring to Fig. 1, a feed gas composed of two components designated as A and B is introduced into the system through line 10. The system includes a plurality of adsorbers, designated as 11 and 12, which contain an adsorbent that will selectively adsorb component A. Each adsorbent is operated in a cyclic manner involving a stage in which the feed is contacted with the adsorbent under high pressure followed by a stage in which it is contacted therewith at low pressure. Thus, at one stage in the operation of adsorber 11, the feed passes through compressor 13 which raises its pressure to the desired high level and then is sent through line 14 and valve 15 into the adsorber. At this time valve 16 in line 17 leading to the other adsorber is closed. Passage of the gas through adsorber 11 at high pressure causes component A to be preferentially retained by the adsorbent, and gas which flows from the adsorber through valve 18 and line 19 accordingly is rich in component B.

After operating in the above manner for a short time such as 2–10 minutes and more preferably 2–4 minutes, adsorber 11 then is operated in a regeneration stage. This is done by closing valve 15 and allowing the pressure in the adsorber to drop to a low level. Valve 18 is then closed, valves 20 and 26 are opened and gas from feed line 10 is passed through line 21 and valve 20 into the adsorber at low pressure. Due to the reduced pressure, previously adsorbed component A is desorbed and is carried out of the adsorber with the gas which flows through valve 26 and line 24. This stream constitutes product which is rich in component A.

After a short time of low pressure operation, such as 2–10 minutes and more preferably 2–4, adsorber 11 begins a new operating cycle and feed gas at high pressure is again passed into it in the manner previously described.

Adsorber 12 is alternately used with the other adsorber in high and low pressure operating stages. At the time when feed gas at high pressure is being fed from compressor 13 to the other adsorber, adsorber 12 is in its regenerating stage and receiving low pressure feed gas from line 21 and valve 22. At this time valve 25 at the bottom is closed and A-rich product is being obtained through valve 23 and line 24. When adsorber 11 enters its regeneration stage, adsorber 12 then receives high pressure feed gas from compressor 13 via line 17 and valve 16. Component A is selectively retained in adsorber 12 and the B-rich product is obtained therefrom through valve 25 and line 19.

The effectiveness of the above-described procedure depends on a change in the equilibrium concentrations of the more adsorbable constituent between the gas phase and the adsorbed phase as the pressure changes. It is characteristic of a gas mixture that, when it is in equilibrium with an adsorbent, it can contain a relatively high concentration of the more adsorbable constituent when the gas pressure is low but only a relatively low concentration when the gas pressure is high. Conversely, the adsorbent can retain such constituent only in relatively low concentration when the gas pressure is low but in relatively high concentration when the gas pressure is high. Accordingly, by first contacting the feed gas with the adsorbent at high pressure, the more adsorbable component will be retained thereon in a relatively high concentration; and then by contacting it with feed gas at relatively low pressure, such adsorbed component will, in part, be drawn into the vapor phase. The effectiveness of the separation improves as the difference between the high and low pressures employed increases. In any case such pressure differences should be at least 25 p.s.i. and preferably in excess of 50 p.s.i.

The effectiveness of the present process also depends on utilizing short time periods in each stage of the cyclic operation. In other words the time during which the feed gas is introduced at high pressure and at low pressure each should be relatively short. By operating in this manner the amount of the more adsorbable component that will pass between the vapor and adsorbed phases during each stage is minimized and a more rapid transfer is effected. Use of the short time periods also is advantageous in minimizing temperature variations in the adsorbent beds resulting from heat of adsorption effects. Accordingly, short time periods for each operating stage, such as in the range of 2–10 minutes and preferably 2–4 minutes, should be employed.

Fig. 2 illustrates a multi-stage operation in accordance with the invention which involves an adsorption system comprising, in effect, an enriching zone and a stripping zone in addition to the initial adsorption zone. While Fig. 2 illustrates only one pair of adsorbers each for the three zones, it is to be understood that any desired number of adsorbers can be used for each such zone. Also it is to be understood that a series of adsorber pairs or groups of adsorbers could be used for the enriching zone and likewise for the stripping zone if it is desired to improve the degree of separation of the feed components. This would be analogous to increasing the number of plates in the enriching and stripping sections of a distillation column. Such additional adsorber pairs or groups would be operated in a manner similar to that described hereinafter for the enriching and stripping zones as illustrated in Fig. 2.

With reference to Fig. 2, the system shown includes a pair of adsorbers 30–a and 30–b to which the feed gas is initially fed, another pair 31–a and 31–b thereabove which constitutes the enriching zone, and another pair 32–a and 32–b therebeneath which constitutes the stripping zone. The two adsorbers for each pair operate alternately in identical manner, with each adsorber operating in a high pressure stage followed by a low pressure stage during a cycle.

The feed gas, comprising components A and B with A being the more adsorbable constituent, enters the system under high pressure through line 33. The feed may, for example, be composed mainly of propylene and a minor amount (e.g. 5%) of propane, with the adsorbent in each of the adsorbers being activated carbon which preferentially removes the propane (A component). The feed is first passed through line 34 to line 35 where it mixes with two recycle streams obtained, respectively, from the enriching zone via line 36 and from the stripping zone via line 37. The mixture flows through valve 38 and is fed to adsorber 30–a under a high pressure such as for example, 100 p.s.i.g. at 100° F. for a time of (say) 2 minutes. During this time propane is selectively adsorbed by the activated carbon, and a stream lean in propane passes from the adsorber through line 39 and valve 40 from which it is sent to the stripping zone via line 41.

Adsorber 30–a next enters its low pressure stage of operation which effects regeneration of the adsorbent. Valves 38 and 40 are closed and feed gas alone passes from line 33 through valve 42 which functions as a pressure reducing valve. The gas flows through adsorber 30–a at a pressure of, for example, 50 p.s.i.g. at 100° F. for a time of (say) 2 minutes. This causes propane to be desorbed from the carbon and the propane enriched material is sent through valve 43 and line 44 to the enriching zone. Thereafter adsorber 30–a again operates in its high pressure stage as previously described.

During the foregoing cycle of operation for adsorber 30–a, adsorber 30–b is operating in opposite stages. Thus, when adsorber 30–a is under high pressure, feed gas alone is sent from line 33 through pressure reducing valve 45 into adsorber 30–b to desorb propane previously retained by the carbon and the propane enriched effluent stream passes through valve 46 and line 44 to the enriching zone. Then, while adsorber 30–a is operating at low pressure, feed gas passes through line 34 where it mixes with the recycle streams from lines 36 and 37, and the mixture flows through valve 47 and passes into adsorber 30–b under high pressure. The propane lean effluent during this time is sent through valve 48 and line 41 to the stripping zone.

The propylene stream from line 41, which is at relatively high pressure, is further purified in the stripping zone in a manner similar to the above-described operation for the initial contact zone. During a portion of each cycle, part of the stream is sent at high pressure through line 49, valve 50 and adsorber 32–a to effect further removal of propane and obtain a propylene rich product which leaves the system through valve 51 and line 52. During this time the remaining material from line 41 is passed through line 53 and pressure reducing valve 54 from which it flows through adsorber 32–b to effect regeneration of the carbon by desorption of propane. The effluent at this stage flows through valve 55 and line 56 to a compressor 57 where its pressure is raised to the necessary high level for recycling it through line 37 back to the initial contact zone. The operations of adsorbers 32–a and 32–b are then reversed. Material from line 41 passes through pressure reducing valve 58 and adsorber 32–a to effect regeneration, with the effluent flowing to compressor 57 via valve 59 and line 56. At the same time material from line 41 is sent under high pressure through line 49 and valve 60 to adsorber 32–b, and propylene-rich product is removed therefrom through valve 61 and line 52.

The propane enriched material passing from the initial contact zone through line 44 is compressed in compressor 62 and then sent through line 63 to the enriching zone which operates in a manner also similar to that previously described. In one stage of its operation compressed gas passes through line 64, valve 65 and adsorber 31–a wherein propane is selectively adsorbed, and a stream having lowered propane content is removed through valve 66 and recycled through line 36 to the initial contact zone. Another portion of the stream from line 63 simultaneously is sent through line 67 and pressure reducing valve 68 into adsorber 31–b to effect regeneration by removal of propane previously adsorbed. The resulting propane rich product leaves the system via valve 69 and line 70. Thereafter the operation is changed so that a portion of the material from line 63 passes through pressure reducing valve 71 and into adsorber 31–a to desorb propane, with the propane enriched product being removed therefrom via valve 72 and line 70; and the remainder of the material flows through line 64 and valve 73 to adsorber 31–b under high pressure to selectively adsorb propane and produce an effluent which is recycled through valve 74 and line 36 to the initial contact zone.

In the foregoing operations for the enriching and stripping zones, the differences in pressure employed in the high and low pressure stages should be generally similar to the differential pressure obtaining in the initial contact zone. Likewise the on-stream times during each stage of the operations generally should be about the same.

It may be seen that methods practiced in accordance with the present invention, as illustrated by Figs. 1 and 2, do not require that heat be supplied at any point in the system. They are therefore more economical than prior procedures requiring heat for regenerating the adsorbent. Furthermore, the present invention can be practiced in isolated locations where only electric power but no fuel is available.

I claim:

1. Method of separating a feed gas comprising components A and B into products rich in A and B, respectively, by means of a series of adsorption zones comprising zones X, Y and Z each containing an adsorbent which will preferentially adsorb A which method comprises the following sequence of operations for said zones: passing the feed gas in admixture with streams R and L hereinafter specified under high pressure through zone X to preferentially adsorb A and withdrawing a first stream enriched in B, then passing feed gas under low pressure through zone X to desorb A and withdrawing a second stream enriched in A; passing said first stream at high pressure through zone Y to further adsorb A and withdrawing a product stream further enriched in B, then passing said first stream at low pressure through zone Y to desorb A, said first stream at low pressure after passing through zone Y constituting previously mentioned stream R, and withdrawing previously specified stream R; passing said second stream at high pressure through zone Z to adsorb A, said second stream at high pressure after passing through zone Z constituting previously mentioned stream L, and withdrawing previously specified stream L, and then passing said second stream at low pressure through zone Z to desorb A and withdrawing a product stream enriched in A.

2. Method according to claim 1 wherein the difference between said high and low pressures in each of said zones is at least 25 p.s.i.

3. Method according to claim 2 wherein the time of contact between the gas and adsorbent in each step of the specified operation is 2–10 minutes.

4. Method according to claim 3 wherein each of zones X, Y and Z includes a plurality of adsorbent-containing chambers and the chambers for each zone are used in sequence for the operations specified for such zone.

References Cited in the file of this patent

UNITED STATES PATENTS

| | | |
|---|---|---|
| 1,948,779 | Abbott et al. | Feb. 27, 1934 |
| 2,354,383 | Kiesskalt | July 25, 1944 |
| 2,702,826 | Kirschenbaum et al. | Feb. 22, 1955 |